(12) United States Patent
Abhari et al.

(10) Patent No.: US 8,026,401 B2
(45) Date of Patent: Sep. 27, 2011

(54) HYDRODEOXYGENATION PROCESS

(75) Inventors: Ramin Abhari, Bixby, OK (US); Peter Havlik, Tulsa, OK (US)

(73) Assignee: Syntroleum Corporation, Tulsa, OK (US)

( * ) Notice: Subject to any disclaimer, the term of this patent is extended or adjusted under 35 U.S.C. 154(b) by 949 days.

(21) Appl. No.: 11/961,501

(22) Filed: Dec. 20, 2007

(65) Prior Publication Data

US 2009/0163744 A1 Jun. 25, 2009

(51) Int. Cl.
*C07C 27/02* (2006.01)
(52) U.S. Cl. .............. 585/240; 44/307; 44/308; 44/605; 585/733; 208/49; 208/57
(58) Field of Classification Search .................. 585/240, 585/242, 733; 44/307–308, 605; 208/49, 208/57
See application file for complete search history.

(56) References Cited

U.S. PATENT DOCUMENTS

| | | | |
|---|---|---|---|
| 2,163,563 A | 6/1939 | Schrauth | |
| 4,992,605 A | 2/1991 | Craig et al. | |
| 5,705,722 A | 1/1998 | Monnier et al. | |
| 5,851,338 A | 12/1998 | Pushaw | |
| 6,855,410 B2 | 2/2005 | Buckley | |
| 7,232,935 B2 | 6/2007 | Myllyoja et al. | |
| 2004/0055209 A1 | 3/2004 | Jakkula et al. | |
| 2004/0230085 A1 | 11/2004 | Jakkula et al. | |
| 2006/0161032 A1 | 7/2006 | Murzin et al. | |
| 2006/0186020 A1 | 8/2006 | Gomes | |
| 2006/0199984 A1 | 9/2006 | Kuechler et al. | |
| 2006/0207166 A1 | 9/2006 | Herskowitz et al. | |
| 2006/0264684 A1 | 11/2006 | Petri et al. | |
| 2007/0006523 A1 | 1/2007 | Myllyoja et al. | |
| 2007/0010682 A1 | 1/2007 | Myllyoja et al. | |
| 2007/0170091 A1 | 7/2007 | Monnier et al. | |
| 2008/0312480 A1* | 12/2008 | Dindi et al. | 585/240 |

FOREIGN PATENT DOCUMENTS

| | | |
|---|---|---|
| EP | 1728844 | 12/2006 |
| SE | 9700149 | 8/1997 |
| WO | WO00/11117 | 3/2000 |
| WO | WO2004/104142 | 12/2004 |
| WO | WO2005/026297 | 3/2005 |
| WO | WO 2007/068795 | 6/2007 |

OTHER PUBLICATIONS

Provisional U.S. Appl. No. 60/934,710.*
Sharma, S.D.; Sagara, K. "Latent Heat Storage Materials and Systems: A Review", International Journal of Green Energy, 2: 1-56, 2005.
Wong, A. Monnier, J.; Stumborg, M.; Hogan E. Technical and Economic Aspects of Manufacturing Cetane-Enhanced Diesel Fuel from Canola Oil'; Bio-Oils Symposium: Saskatoon, Saskatchewan, Canada; Mar. 2-3, 1994.

* cited by examiner

*Primary Examiner* — Walter Griffin
*Assistant Examiner* — Brian McCaig
(74) *Attorney, Agent, or Firm* — Hall Estill Law Firm

(57) ABSTRACT

A process for producing a hydrocarbon from biomass. A feed stream having free fatty acids, fatty acid esters or combinations thereof is provided. The feed stream is heated in the presence of a first catalyst to produce a partially hydrodeoxygenated stream. The partially hydrodeoxygenated stream is heated in the presence of a second catalyst to produce an effluent stream containing the hydrocarbon.

16 Claims, 3 Drawing Sheets

HYDRODEOXYGENATION PROCESS

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The present invention relates generally to a process which removes oxygen from biomass, and more particularly, not by way of limitation, to an improved hydrodeoxygenation process.

2. Brief Description of the Related Art

Biomass is a renewable alternative to fossil raw materials in production of liquid fuels and chemicals. Increase of biofuels production is part of the government's strategy to improve energy security and reduce green house gas emissions. However, most biomass has high oxygen content which lowers fuel quality and heat value. Upgrading biomass or biomass intermediates into high quality hydrocarbon fuels thus requires removal of oxygen. The biomass oxygen may be in the form of an ester, carboxylic acid or hydroxyl groups.

Removal of oxygen by catalytic reaction with hydrogen is referred to as hydrodeoxygenation (HDO). This reaction may be conducted with conventional fixed-bed bimetallic hydrotreating catalysts such as sulfided nickel-molybdenum (NiMo) or cobalt-molybdenum (CoMo) which are commonly used in refineries.

Unrefined vegetable oils and animal fats have several hundred ppm phosphorus in the form of phospholipids. In addition, animal fats may contain up to a thousand ppm metal chloride salts. The salts are soluble in the fat/grease feed, but come out of solution during the HDO reaction and plug the catalyst bed. The metals/salts can also deactivate the catalyst by reducing available pore surface. In the presence of free fatty acids, metal chlorides may form soluble soaps (e.g. calcium stearate). In such form, metals are difficult to remove using conventional cleanup technologies such as water washing.

Several prior art processes for producing fuels from starting materials such as plants and animals are known. Conversion of vegetable oils to n-paraffins has been reported in the prior art. Some prior art has shown that the process may be applied to other forms of biomass such as tall oil fatty acids, animal fats, and restaurant greases. Hydroisomerization of the bio-derived n-paraffins to isoparaffinic diesel has been taught in the prior art.

Other prior art describes use of feed treatment upstream of an HDO reactor. Overall cleanup efficiency of 75% is reported. However no attempt is made to improve the hydrocarbon yields by increasing HDO efficiency. In fact the CO+CO$_2$ yields reported are as high as 15% (which is near theoretical maximum decarboxylation (DCO), suggesting very low HDO efficiency).

Still other prior art teaches use of feed dilution to achieve better catalyst life. Solvent dilution is used to lower average bed temperatures for the exothermic HDO reaction, which in turn reduces the heavy side products that are formed at high temperature and reduce catalyst activity. However the level of dilution reported for good results is between 3% and 20%. This level of feed dilution translates to a significant increase in reactor size and separation/recycle costs.

Use of pre-hydrogenation to saturate the double-bonds in the triglyceride is described in other prior art. However, this pre-hydrogenation describes the well-known vegetable oil hydrogenation process which does not remove any oxygen. As such, the hydrogenolysis load on the main HDO catalyst is not affected by such pre-hydrogenation.

To this end, although processes of the existing art utilize biomass to produce biofuels, further improvements are desirable to increase HDO efficiency, reduce water partial pressure in the reactor, achieve a low capital/low operating cost method of removing heat from the fixed-bed reactor system, or address the problems with high acid feeds (characteristic of fatty acid containing biomass), which impacts preheater/reactor metallurgy and catalyst attrition. It is to such a process that the present invention is directed.

SUMMARY OF THE INVENTION

Figure 1:
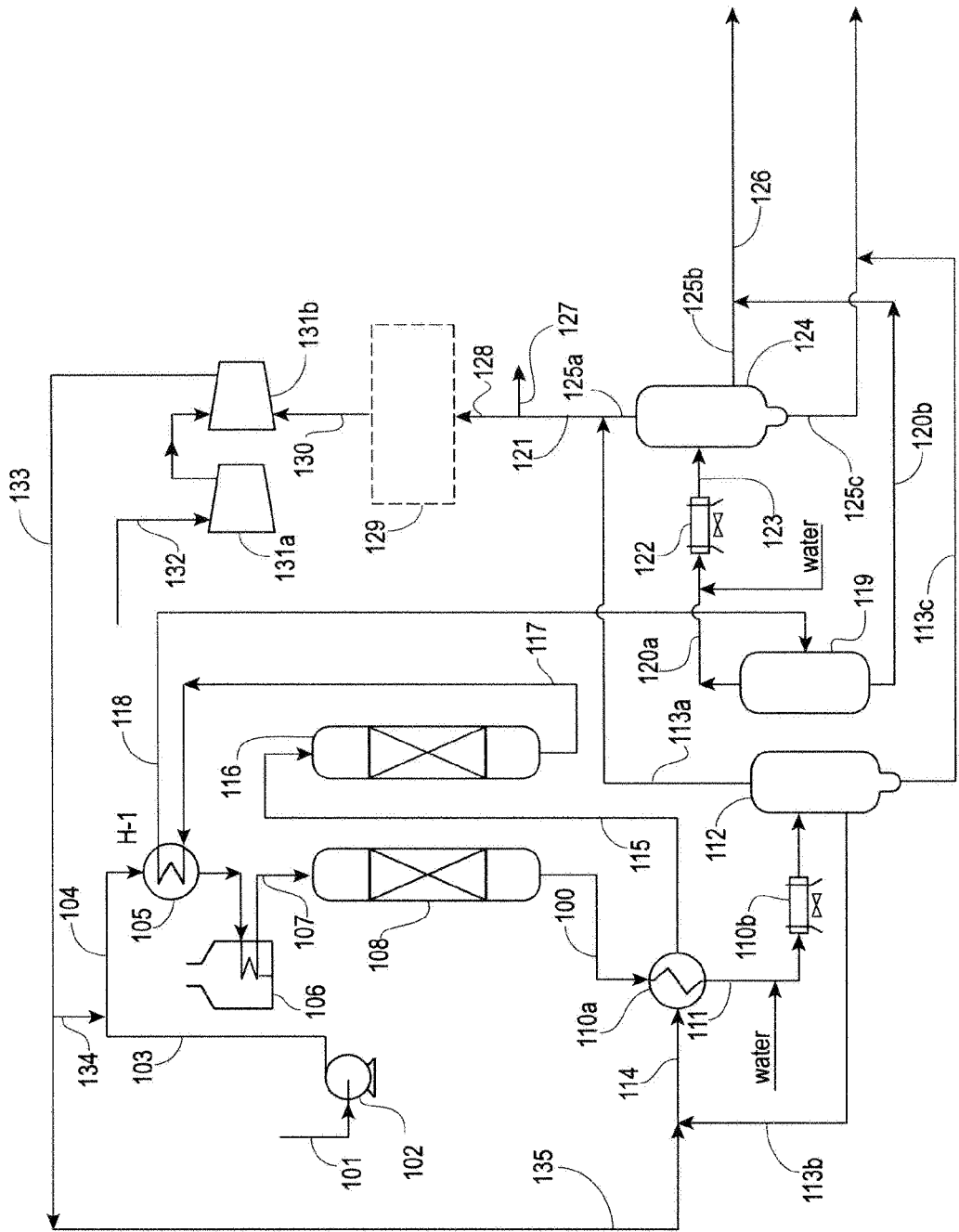
FIG. 1 is a schematic diagram of an operation of a hydrodeoxygenation process according to the present invention.

Vegetable oils, animal fats, and greases are glycerides (di- and tri-esters) with varying concentrations of free fatty acids (carboxylic acids).

The ideal triglyceride HDO conversion is shown in Equation (1). More typically, the HDO reaction is accompanied by the DCO reaction shown in Equation (2). Since DCO involves loss of a carbon atom while HDO does not, the ideal HDO reaction is preferred for high hydrocarbon yields. Furthermore, DCO generates CO$_2$ and CO which need to be removed from the recycle hydrogen, thus adding to the cost of the HDO process.

By conducting the HDO conversion in two selective steps, the ideal Equation (1) conversion for the triglyceride is accomplished. The two selective HDO steps involve: 1) cracking of the triglyceride into a fatty alcohol and a diester (Equation (3)), and 2) hydrodeoxygenating the fatty alcohol and the diester to paraffins (Equations (5) and (6)). (Equation (3)+Equation (5)+Equation (6)=Equation (1)). The first step uses a low activity catalyst such as Mo, the second step requires use of higher activity catalysts such as NiMo. The process uses two different types of catalysts to achieve two selective HDO reactions. The first step HDO reaction also converts the free fatty acid according to Equation (4).

Equations:

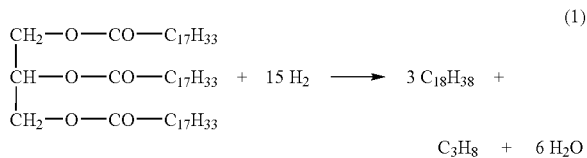

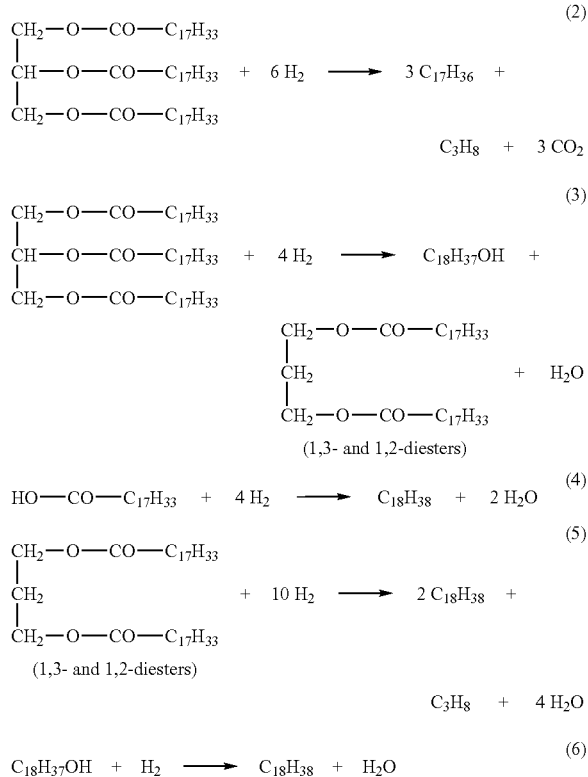

$$\begin{array}{l}
CH_2-O-CO-C_{17}H_{33}\\
|\\
CH-O-CO-C_{17}H_{33} + 6H_2 \longrightarrow 3C_{17}H_{36} +\\
|\\
CH_2-O-CO-C_{17}H_{33}
\end{array} \quad (2)$$

$$C_3H_8 + 3CO_2$$

$$\begin{array}{l}
CH_2-O-CO-C_{17}H_{33}\\
|\\
CH-O-CO-C_{17}H_{33} + 4H_2 \longrightarrow C_{18}H_{37}OH +\\
|\\
CH_2-O-CO-C_{17}H_{33}
\end{array} \quad (3)$$

$$\begin{array}{l}
CH_2-O-CO-C_{17}H_{33}\\
|\\
CH_2 \qquad\qquad\qquad\qquad + H_2O\\
|\\
CH_2-O-CO-C_{17}H_{33}
\end{array}$$
(1,3- and 1,2-diesters)

$$HO-CO-C_{17}H_{33} + 4H_2 \longrightarrow C_{18}H_{38} + 2H_2O \quad (4)$$

$$\begin{array}{l}
CH_2-O-CO-C_{17}H_{33}\\
|\\
CH_2 \qquad\qquad + 10H_2 \longrightarrow 2C_{18}H_{38} +\\
|\\
CH_2-O-CO-C_{17}H_{33}
\end{array} \quad (5)$$
(1,3- and 1,2-diesters)

$$C_3H_8 + 4H_2O$$

$$C_{18}H_{37}OH + H_2 \longrightarrow C_{18}H_{38} + H_2O \quad (6)$$

Note: Oleic acid is shown as typical fatty acid for all illustrative reactions. It should be understood by one of ordinary skill in the art that the fatty acid composition may vary considerably in feed stocks of different origin.

DETAILED DESCRIPTION OF THE INVENTION

Referring now to the drawings, and more particularly to FIG. 1, shown therein is a schematic of the operation of the process in accordance with the present invention as described herein. A biofeed 101, containing fatty acids and/or fatty acid esters, is pressurized to between about 1,200-1,800 psig using pump 102. A pressurized biofeed 103 is combined with a recycled hydrogen stream 134 (compressed to the same pressure) such that a combined reactor feed 104 is heated through a feed-effluent heat exchanger 105 before further heating to the desired reactor inlet temperature of between about 600-650° F. in heater 106. A preheated feed stream 107 enters a first stage HDO reactor 108. The first stage HDO reactor 108 is packed with a high pore capacity alumina impregnated with a low activity hydrogenation metal. In addition to alumina, silica, aluminum phosphate, and combinations of these, may also be used. Suitable active metals for this type of catalyst include molybdenum, chromium, tungsten, copper, and others from Group VIB, VIIB, and IB of the periodic table, as fully reduced metal or metal sulfide. Since the first stage HDO reactor 108 acts as a "guard reactor" for a second stage HDO reactor, provisions for mitigating fouling are made by using larger-size, high void catalysts. One example of a catalyst that may be used in the first stage HDO reactor 108 is TK-709 commercially available from Haldor Topsoe. The reaction which occurs in the first stage HDO reactor 108 converts the fatty acids to paraffin (Equation (4)), while cracking the triglycerides into fatty alcohols and smaller esters (Equation (3)).

The effluent 109 of the first stage HDO reactor 108 is cooled through a feed-effluent heat exchanger 110*a*. A cooled stream 111 contains hydrocarbons, fatty alcohols, and esters in liquid phase, and hydrogen and water vapor in gas phase. Additional water is introduced to wash the salt deposits that are formed upon condensation of water. The two phase cooled stream 111 is cooled further in air cooler 110*b* to condense all water. Water, organic liquid, and hydrogen-rich vapor are separated in a three-phase separator drum 112.

With the fatty acids converted in the first stage HDO reactor 108, the metals not trapped in the catalyst are expected to be removed with drum 112 water stream 113*c*. A hydrogen rich vapor phase 113*a* from drum 112 is recycled to the HDO reactors. A partially hydrodeoxygenated liquid 113*b* is combined with recycled hydrogen 135. A combined stream 114 is heated in the heat exchanger 113*a* before entering a second stage HDO reactor 116 at about 550° F. Since the fatty acids were converted in reactor 108, the heat exchanger 110*a* and the second stage HDO reactor 116 need not be designed for acid service. The remaining oxygen atoms in the fatty alcohol and diester intermediate are removed via hydrogenolysis over a bimetallic catalyst, such as sulfided NiMo on alumina in the second stage HDO reactor 116 (Equations (5) and (6)). Other catalysts suitable for use in reactor 116 include sulfided CoMo and NiMo on supports such as alumina, aluminum phosphate, silica, or combinations thereof.

Effluent 117 is cooled in the heat exchanger 105. A cooled stream 118 contains n-paraffins in liquid phase, and water, hydrogen, and propane in vapor phase. Liquid and vapor are separated in a drum 119. A vapor stream 120*a* is cooled in an air cooler 122 to condense the light hydrocarbons (including propane) and water. A three phase stream 123 is separated in a drum 124 into a hydrogen-rich vapor stream 125*a*, a paraffin product stream 125*b*, and water 125*c*. The water is combined with HDO water 113*c* from reactor 108 and sent to offsite water treatment for use or disposal. Paraffin product streams 120*b* and 125*b* may be combined into a single stream 126. The n-paraffins in stream 126 may be hydroisomerized to isoparaffinic diesel and/or hydrocracked to isoparaffinic kerosene jet fuel. The LPG and naphtha co-products may then be separated. A fixed-bed reactor similar to the HDO reactors described herein may be used for hydroisomerization/hydrocracking. Suitable catalysts include Group VIIIB metals such as platinum, palladium, and nickel on amorphous or crystalline supports such as alumina, fluorided alumina, silica, ferrierite, ZSM-12, ZSM-21, SAPO-11, and SAPO-31.

The desired hydrogen concentration in a recycle treat gas 133 may be reached by purging (stream 127) some of the recycle hydrogen and replacing that with makeup hydrogen (stream 132). To reduce the purge/recycle ratio, hydrogen-rich vapors 121 may be processed through a purification unit 129. Impurities such as hydrogen sulfide, ammonia, carbon dioxide, and carbon monoxide present in recycle treat gas 128 are thus removed in unit 129 to provide high purity hydrogen treat gas 130 for HDO reaction. Scrubbers (absorption columns) are commonly used for this application. Makeup hydrogen gas 132 is pressurized in compressor 131*a* and combined with treat gas 130 in recycle compressor 131*b* to provide the treat gas for the HDO reactors.

Figure 2:
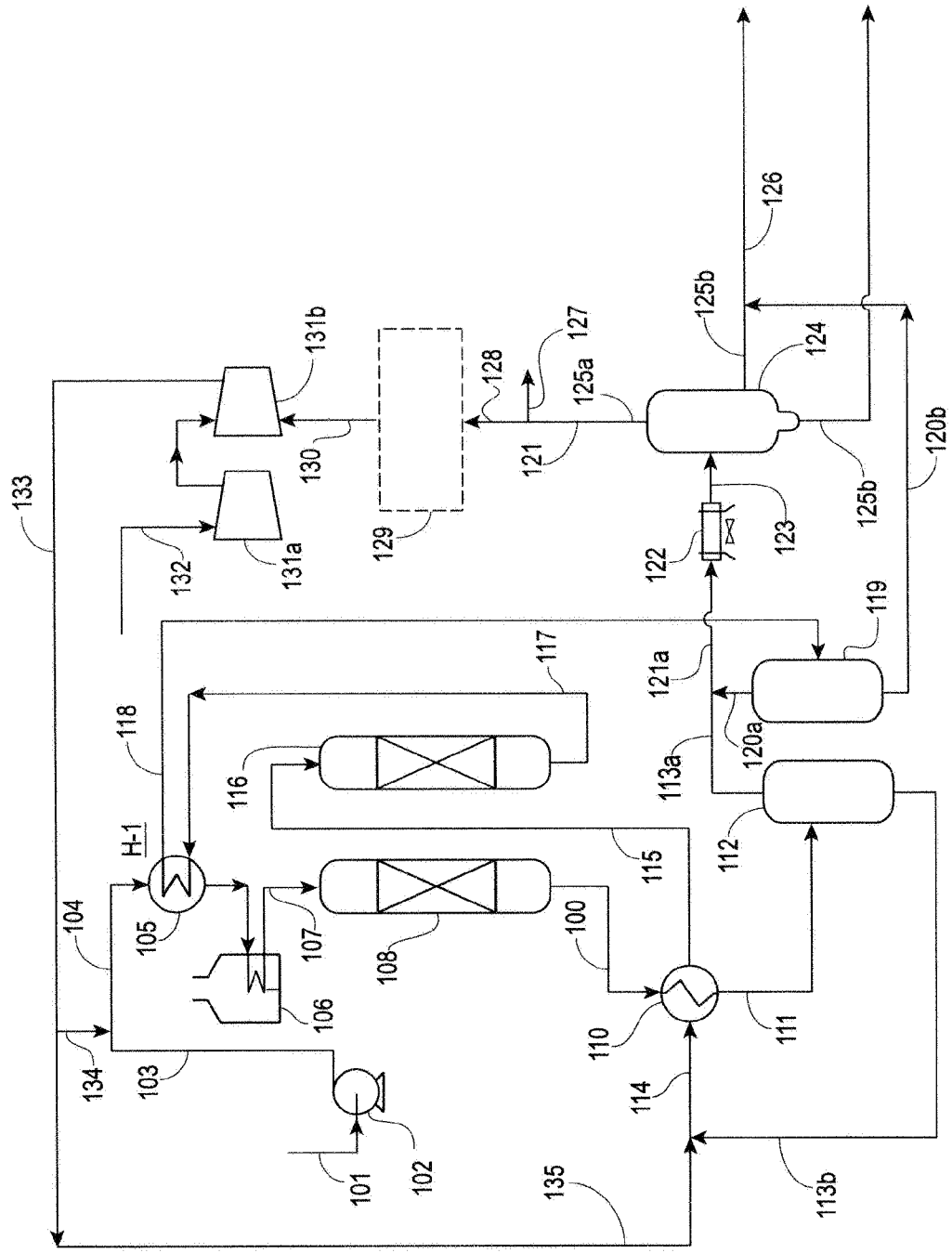
FIG. 2 is a schematic diagram showing an alternative embodiment of a hydrodeoxygenation process according to the present invention.

Referring to FIG. 2, shown therein is another embodiment of the operation of the process generally in accordance with the invention as described herein except that the water from the first stage HDO reactor 108 is not recovered as a liquid effluent. Instead, water vapors from both HDO reactors 108 and 116 are combined as vapor stream 121*a* for condensing in the single air cooler 122. Although a lower capital cost embodiment, the water soluble salts are not removed with inter-stage water effluent. Modifications may be made to the two-stage HDO process to account for changes in feed quality as shown in FIG. 2. For example, if the feed is deficient in organic sulfur, a sulfur agent must be introduced to keep the catalysts in the sulfide state. As another example, hydrogen quench may be employed to reduce the temperature rise across each bed. Additionally, removal of water between the two reaction stages provides an effective means of removing reaction heat and decreases water partial pressure (and increases the hydrogen partial pressure) which is known to increase catalyst stability. It should be understood by one of ordinary skill in the art that such modifications are within the spirit of the inventive two-stage HDO process.

The two-step HDO process solves other process needs not met by a single stage adiabatic fixed-bed reactor typically used in the prior art. The two-step process provides an effective way of removing heat from the exothermic HDO conversion, reduces water partial pressure, and prevents contaminants from deactivating/plugging the high activity catalyst bed. Furthermore, by selectively converting the free fatty acids in the first stage HDO reactor 108, the corrosive load on the second stage HDO reactor 116 and catalyst is eliminated.

In order to further illustrate the present invention, the following examples are given. However, it is to be understood that the examples are for illustrative purposes only and are not to be construed as limiting the scope of the subject invention.

EXAMPLES

Example 1

Two-Stage HDO Process

A blend of brown grease, yellow grease, poultry oil, floatation grease, and lard was prepared. The fatty acid profile of the blend is summarized in Table I. Additional properties, including free fatty acid and contaminants concentration, are listed in Table II under the heading "Feed."

TABLE I

| Fatty Acid Distribution of Feedstock (wt %) | |
|---|---|
| C12:0 | 0.1 |
| C14:0 | 0.9 |
| C15:0 | 0.1 |
| C16:0 | 21 |
| C17:0 | 0.3 |
| C18:0 | 8.5 |
| C20:0 | 0.6 |
| C22:0 | 0.1 |
| C14:1 | 0.2 |
| C15:1 | <0.1 |
| C16:1 | 4.4 |
| C17:1 | 0.1 |
| C18:1 | 42.4 |
| C18:2 | 19.2 |
| C18:3 | 1.1 |
| C20:1 | 0.8 |
| C20:2+ | 0.2 |

TABLE II

Performance of First Stage HDO Reactor (Note a)

| | First Stage HDO Reactor Temp | | | |
|---|---|---|---|---|
| | Feed | 500° F. | 600° F. | 650° F. |
| Product Analysis | | | | |
| Acid number (mg KOH/g) | 72.3 | 37.9 | 5.34 | 1.65 |
| % Unsaponifiables | 1.26 | 7.35 | 57.2 | 79.1 |
| % Free fatty acids | 38.05 | 19.95 | 2.81 | 0.87 |
| % Triglycerides (Note b) | 58.48 | 56.73 | 16.5 | 0.851 |
| ICP Analysis (wppm) | | | | |
| Iron | 142 | 42.7 | 25.1 | 26.5 |
| Phosphorus | 193 | 31.6 | 91.3 | 75.9 |
| Group I + II metals | 987 | 358 | 439 | 508 |
| Byproduct yields (wt %) | | | | |
| Water | — | 1.23 | 5.58 | 6.6 |
| CO | — | 0.23 | 0.45 | 0.72 |
| CO2 | — | 0.0 | 0.15 | 0.70 |

Notes:
(a) All runs at 1600 psig pressure, 2 LHSV feed rate, and 7,500 scf/bbl gas-to-oil ratio
(b) GC retention time 22-25 min.

A 100 cc pilot plant reactor was filled with a bottom bed of low activity molybdenum oxide catalyst and a top bed of inerts. The bottom bed consisted of 28.2 g TK-709 catalyst from Haldor Topsoe (ground and sieved to −20+100 mesh size) and 37.8 g of inert glass beads (−70+100 mesh). The top bed was 19.2 g TK-30 alumina inert reactor topping media from Haldor Topsoe and 25.2 g glass beads.

The molybdenum catalyst was sulfided by dimethyl disulfide diluted in ultra-low sulfur diesel solvent. The maximum sulfiding temperature was 700° F. at which the reactor was held for 16 hours. The reactor was then cooled down to 400° F. with solvent still flowing. Liquid flow was at 2 LHSV (active catalyst basis) and hydrogen flow at 7,000-8,000 scf/bbl throughout this sulfiding and catalyst break-in period.

The feed was pumped through the reactor at 1600 psig $H_2$ pressure while temperature was ramped to target condition for the experiment. The test conditions and results are summarized in Table II.

The drop in acid number suggests conversion of free fatty acids starting below 500° F. and virtually complete at 650° F. The gas chromatogram (GC) of the reactor product stream indicated complete conversion of the triglyceride at 650° F. Further analysis using GC-MS, GC with a paraffin-olefin-alcohol standard, and FTIR spectroscopy confirmed that the products of triglyceride conversion were fatty alcohols and diesters.

The product of the 600° F. and the 650° F. conversion runs above were combined and used as feed to another 100 cc reactor. The reactor contained a NiMo catalyst and was sulfided according to the procedure described earlier in this example. Two runs at different temperatures and space velocities were conducted and are summarized in Table III.

TABLE III

Performance of Second Stage HDO Reactor (Notes a, b)

| | Run 1 | Run 2 |
|---|---|---|
| LHSV (hr$^{-1}$) | 3 | 1.5 |
| WABT (F.) | 680 | 700 |
| gas-to-oil ratio (scf/bbl) | 16,000 | 10,000 |

TABLE III-continued

Performance of Second Stage HDO Reactor (Notes a, b)

|  | Run 1 | Run 2 |
|---|---|---|
| Specific gravity | 0.805 | 0.795 |
| Water yield (wt %) | 4.6 | 7.8 |

Figure 3:
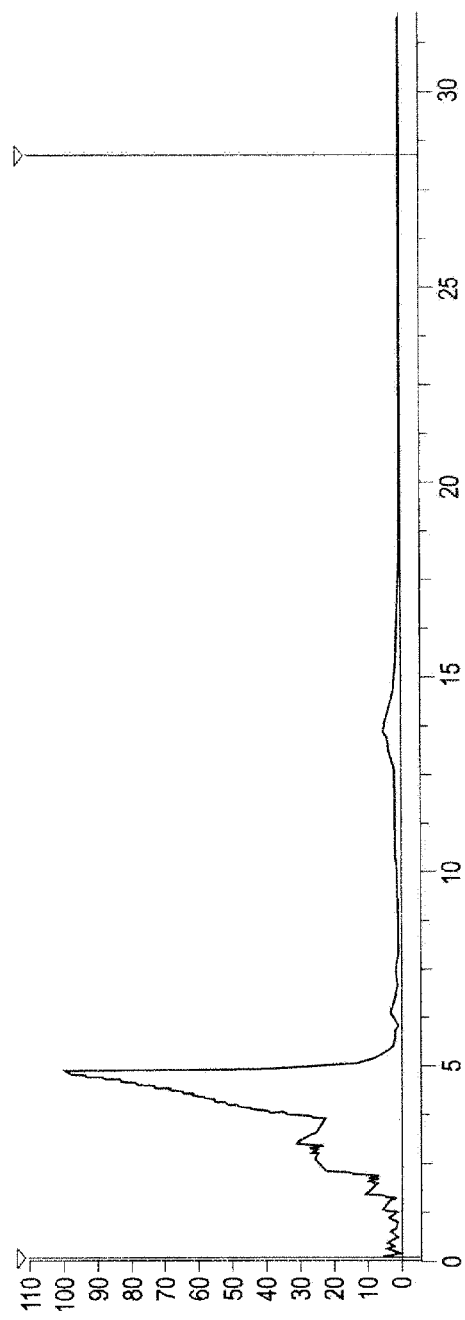
FIG. 3 is a gas chromatogram of Run 1 shown in Table III.
Figure 4:
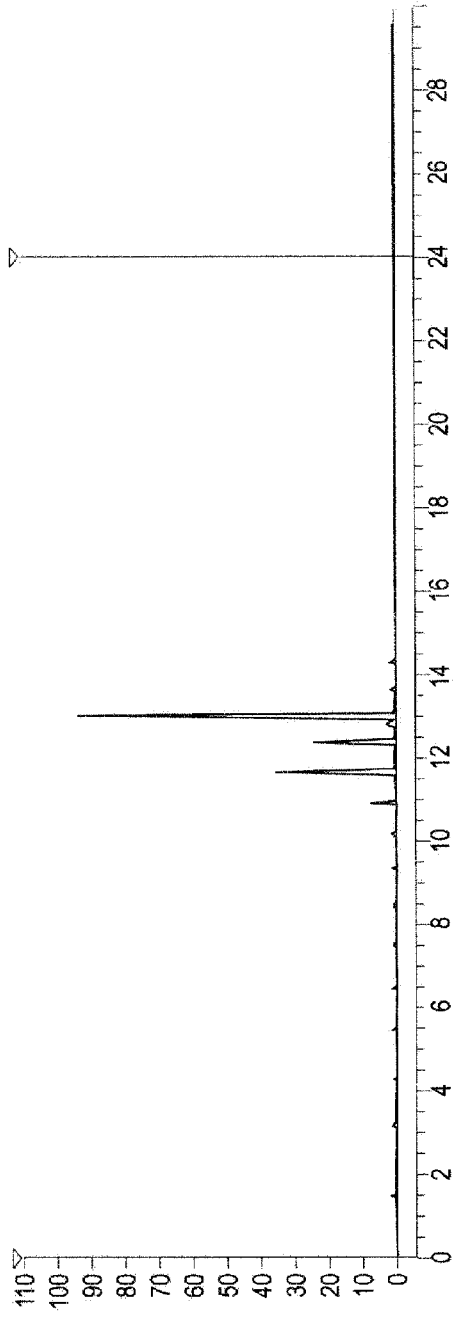
FIG. 4 is a gas chromatogram of Run 2 shown in Table III.

Notes:
(a) Reactor feed composite of first stage HDO reactor from 600 and 650 F. (see Table I)
(b) Both runs at 1600 psig pressure Run 2 resulted in complete conversion to n-paraffins, as suggested by specific gravity and GC (FIG. 3). The HDO efficiency was calculated by ratio of n-C18 to sum of n-C17 and n-C18. (Since there is very little C17 fatty acid in the triglyceride/fatty acid feedstock, all n-C17 must be formed via DCO.) The HDO efficiency was thus calculated to be 80%.

Example 2

One-Stage HDO Process

A 100 cc isothermal tubular reactor was filled with 80 cc of NiMo-on-alumina catalyst pellets (commercial catalyst from Catalyst Trading Company, Ltd., Houston) and +70-100 mesh glass beads. The catalyst had the same MoO3/NiO loading and surface area as the NiMo catalyst of Example 1 and was sulfided according to the method described therein. The reactor was operated at 700 F and 1,200-1,600 psig H2 pressure with both vegetable oils and animal fat feeds. The feed flow rate was 1 LHSV (active catalyst basis), with about 10,000 scf/bbl H2-to-feed ratio. The n-paraffin products obtained were analyzed by GC and the HDO efficiency was calculated according to the method described in Example 1. The HDO efficiencies were 63% for tallow (beef fat), 58% for palm oil, and 66% for canola oil.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A process for producing a hydrocarbon from biomass, comprising the steps of:
   providing a feed stream containing biomass having free fatty acids, fatty acid esters, or combinations thereof;
   heating the feed stream in the presence of a monometallic molybdenum catalyst to produce a partially hydrodeoxygenated stream; and
   heating the partially hydrodeoxygenated stream in the presence of a second catalyst to produce an effluent stream containing the hydrocarbon.

2. The process of claim 1 wherein the biomass includes vegetable oils, animal fats, restaurant greases, waste industrial frying oils, tall oil fatty acid, or combinations thereof.

3. The process of claim 1 wherein the second catalyst is bimetallic.

4. The process of claim 3 wherein the bimetal is selected from the group consisting of NiMo, CoMo, and NiW.

5. The process of claim 1 wherein the feed stream is heated to a temperature in a range of about 500° F. to about 650° F.

6. The process of claim 1 wherein the partially hydrodeoxygenated stream is heated to a temperature in a range of about 550° F. to about 700° F.

7. The process of claim 1 further comprising the step of:
   isomerizing the hydrocarbon of the effluent stream to provide an isoparaffin.

8. The process of claim 1 wherein the monometallic molybdenum catalyst has low hydrogenation activity.

9. The process of claim 1 wherein the monometallic molybdenum catalyst is supported on a high pore capacity alumina.

10. The process of claim 1 wherein the monometallic molybdenum catalyst removes at least about 50% of the metals and phosphorus in the feed stream.

11. The process of claim 1 wherein the feed stream comprises at least about 5.0 weight % of free fatty acids.

12. A process for hydrodeoxygenation, comprising the steps of:
   cracking a triglyceride into at least one fatty alcohol and at least one diester in the presence of a monometallic molybdenum catalyst; and
   hydrodeoxygenating the at least one fatty alcohol and the at least one diester into at least one hydrocarbon.

13. The process of claim 12 wherein free fatty acids are converted to fatty alcohols and hydrocarbons in the presence of the monometallic molybdenum catalyst.

14. The process of claim 12 wherein the at least one fatty alcohol and the at least one diester are hydrodeoxygenated in the presence of a high activity catalyst.

15. The process of claim 12 further comprising the step of:
   isomerizing the at least one hydrocarbon to at least one isoparaffin.

16. The process of claim 12 wherein the monometallic molybdenum catalyst is a low activity hydrogenation catalyst.

* * * * *